United States Patent

Haartsen

[11] Patent Number: 6,047,187
[45] Date of Patent: Apr. 4, 2000

[54] STABILIZED CONTROL CHANNEL PLANNING USING LOOSELY COUPLED DEDICATED TRAFFIC CHANNELS

[75] Inventor: Jacobus Cornelis Haartsen, Skåne, Sweden

[73] Assignee: Ericsson, Inc., Research Triangle Park, N.C.

[21] Appl. No.: 08/418,682

[22] Filed: Apr. 7, 1995

[51] Int. Cl.$^7$ .................................................. H04Q 7/20
[52] U.S. Cl. ...................... 455/450; 455/453; 455/434; 455/509; 455/511
[58] Field of Search .................... 455/33.1, 33.2, 455/34.2, 54.1, 62, 67.1, 63, 434, 450, 451, 452, 455, 509, 511, 515, 516; 379/59

[56] References Cited

U.S. PATENT DOCUMENTS

| | | | |
|---|---|---|---|
| 4,485,486 | 11/1984 | Webb et al. | 455/33 |
| 4,551,852 | 11/1985 | Grauel | 455/33 |
| 4,750,198 | 6/1988 | Harper | 379/59 |
| 4,866,710 | 9/1989 | Schaeffer | 370/95.1 |
| 5,038,399 | 8/1991 | Bruckert | 455/33 |
| 5,056,109 | 10/1991 | Gilhousen et al. | 375/1 |
| 5,109,528 | 4/1992 | Uddenfeldt | 455/33.2 |
| 5,123,110 | 6/1992 | Grube | 455/33.1 |
| 5,157,709 | 10/1992 | Ohteru | 379/58 |
| 5,175,867 | 12/1992 | Wejke et al. | 455/33.1 |
| 5,185,739 | 2/1993 | Spear | 370/95.3 |
| 5,203,012 | 4/1993 | Patsiokas et al. | 455/34.1 |
| 5,218,630 | 6/1993 | Patsiokas et al. | 379/58 |
| 5,230,082 | 7/1993 | Ghisler et al. | 455/33.2 |
| 5,239,676 | 8/1993 | Strawczynski et al. | 455/33.2 |
| 5,239,678 | 8/1993 | Grube et al. | 455/511 |
| 5,247,699 | 9/1993 | Hartman | 455/33.1 |
| 5,276,908 | 1/1994 | Koohgoli et al. | 455/34.1 |
| 5,309,503 | 5/1994 | Bruckert et al. | 379/60 |
| 5,363,428 | 11/1994 | Nagashima | 379/58 |
| 5,369,783 | 11/1994 | Childress et al. | 455/17 |
| 5,442,809 | 8/1995 | Daiz et al. | 455/54.1 |
| 5,475,868 | 12/1995 | Duque-Anton | 455/62 |

FOREIGN PATENT DOCUMENTS

| | | |
|---|---|---|
| 411 878 | 2/1991 | European Pat. Off. . |
| 0 431 956 | 6/1991 | European Pat. Off. . |
| 458 158 | 11/1991 | European Pat. Off. . |
| 0 513 841 | 11/1992 | European Pat. Off. . |
| 578 197 | 1/1994 | European Pat. Off. . |
| 0 585 994 | 3/1994 | European Pat. Off. . |
| 0 585 994 A2 | 3/1994 | European Pat. Off. . |
| 4-124920 | 4/1992 | Japan . |
| 6-284075 | 7/1994 | Japan . |
| 2 266 433 | 10/1993 | United Kingdom . |
| WO93/08655 | 4/1993 | WIPO . |

OTHER PUBLICATIONS

M. Almgren et al., "Capacity Enhancements in a TDMA System", *VTC '93*, 1993.

H. Andersson et al., "Adaptive Channel Allocation in a TIA IS–54 System," *42nd IEEE Veh. Tech. Conf.*, pp. 778–781, Denver, 1992.

R. Beck & H. Panzer, "Strategies for Handover and Dynamic Channel Allocation in Micro–Cellular Mobile Radio Systems," *39th IEEE Vehicular Technology Conf.*, pp. 178–185, 1989.

R.C. Bernhardt, "Call Performance in a Frequency Reuse Digital Portable Radio System," *IEEE Transactions on Vehicular Technology*, pp. 777–785, vol. 40, No. 4, Nov. 1991.

(List continued on next page.)

*Primary Examiner*—Daniel S. Hunter
*Assistant Examiner*—Darnell R. Armstrong
*Attorney, Agent, or Firm*—Burns, Doane, Swecker & Mathis, L.L.P.

[57] ABSTRACT

Methods and systems for allocating control channels in a radiocommunication system are disclosed. Control channels are associated with dedicated traffic channels. The allocation history of dedicated traffic channels can be monitored to determine which dedicated traffic channels are allocated most frequently to a base station. A control channel can then be allocated to the base station based on the allocation history of the associated dedicated traffic channels.

14 Claims, 5 Drawing Sheets

OTHER PUBLICATIONS

R.C. Bernhardt, "Time–Slot Management in Frequency Reuse Digital Portable Radio Systems," *Proc. of Veh. Tech. Conf.*, 282–286, 1990.

J. C.–I. Chuang, "Autonomous Adaptive Frequency Assignment for TDMA Portable Radio Systems," *IEEE Transactions on Vehicular Technology*, pp. 627–635, vol. 40, No. 3, Aug. 1991.

J. C.–I. Chuang, "Autonomous Frequency Assignment and Access for TDMA Personal Portable Radio Communications," *41st IEEE Vehicular Technology Conf.*, pp. 699–703, St. Louis, May 1991.

J.C.–I. Chuang, "Performance Issues and Algorithms for Dynamic Channel Assignment," *Proc. IEEE GLOBECOM '92*, pp. 1419–1424, Orlando, 1992.

D.C. Cox & D.O. Reudink, "Increasing Channel Occupancy in Large–Scale Mobile Radio Systems: Dynamic Channel REassignment," *IEEE Transactions on Communications*, pp. 1302–1306, vol. COM–21, No. 11, Nov. 1973.

M. Duque–Antón et al., "Channel Assignment for Cellular Radio Using Simulated Annealing," *IEEE Transactions on Vehicular Technology*, pp. 14–21, vol. 42, No. 1, Feb. 1993.

H. Eriksson, "Capacity Improvement by Adaptive Channel Allocation," *IEEE Global Telecom. Conference*, pp. 1355–1359, Nov. 28–Dec. 1, 1988.

H. Eriksson & R. Bownds, "Performance of Dynamic Channel Allocation in the DECT System," *41st IEEE Vehicular Technology Conf.* pp. 693–698, St. Louis, May 1991.

D. Everitt & D. Manfield, "Performance Analysis of Cellular Mobile Communication Systems with Dynamic Channel Assignment," *IEEE Journal on Selected Areas in Communications*, pp. 1172–1180, vol. 7, No. 8, Oct. 1989.

G. Falciasecca et al., "On the Impact of Traffic Burst on Performances of High Capacity Cellular Systems," *Proc. of Veh. Tech. Conf.*, pp. 646–651, 1990.

M. Frodigh, "Reuse–Partitioning Combined with Traffic Adaptive Channel Assignment for Highway Microcellular Radio Systems," *Proc. IEEE GLOBECOM'92*, pp. 1414–1418, Atlanta, 1992.

Y. Furuya & Y. Akaiwa, "Channel Segregation, A Distributed Adaptive Channel Allocation Scheme for Mobile Communication Systems," *Second Nordic Seminar on Digital Land Mobile Radio Communications*, pp. 311–315, Stockholm, Oct. 14–16, 1986.

A. Gamst, "Some Lower Bounds for a Class of Frequency Assignment Problems," *IEEE Transactions on Vehicular Technology*, pp. 8–14, vol. VT–35, No. 1, Feb. 1986.

T. Kanai, "Autonomous Reuse Partitioning in Cellular Systems," *42nd IEEE Veh. Tech. Conf.*, 782–785, Denver 1992.

D. Kunz, "Practical Channel Assignment Using Neural Networks," *VTC '90*, pp. 652–655, 1990.

R.W. Nettleton & G.R. Schloemer, "A High Capacity Assignment Method for Cellular Mobile Telephone Systems," *Proc. of Veh. Tech. Conf.*, pp. 359–367, San Francisco, May 1–3, 1989.

R.W. Nettleton, "Traffic Statistics in a Self–Organizing Cellular Telephone System," *Proc. of Veh. Tech. Conf.*, pp. 305–310, 1990.

S.–H. Oh & D.–W. Tcha, "Prioritized Channel Assignment in a Cellular Radio Network," *IEEE Transactions on Communications*, pp. 1259–1269, vol. 40, No. 7, Jul. 1992.

S. Onoe & S. Yasuda, "Flexible Re–use for Dynamic Channel Assignment in Mobile Radio Systems," *Proc. IEEE ICC'89*, pp. 472–476, Jun. 1989.

H. Panzer & R. Beck, "Adaptive Resource Allocation in Metropolitan Area Cellular Mobile Radio Systems," *Proc. of Veh. Tech. Conf.*, pp. 638–645, 1990.

G. Riva, "Performance Analysis of an Improved Dynamic Channel Allocation Scheme for Cellular Mobile Radio Systems," *42nd IEEE Veh. Tech. Conf.*, pp. 794–797, Denver, 1992.

A.N. Rosenberg, "Simulation of Power Control and Voice–Channel Selection in Cellular Systems," *Proc. IEEE VTC'85*, pp. 12–15, 1985.

K. Sallberg et al., "Hybrid Channel Assignment and Reuse Partitioning in a Cellular Mobile Telephone System," *Proc. IEEE VTC '87*, pp. 405–411, 1987.

L.P. Shu & J.W. Chen, "Dynamic Grouping Algorithm for Cellular Communications Systems," *Proc. of Veh. Tech. Conf.*, pp. 689–692, 1991.

K.N. Sivarajan et al., "Channel Assignment in Cellular Radio," *Proc. of Veh. Tech. Conf. 1989*, pp. 846–850, 1989.

K.N. Sivarajan et al., "Dynamic Channel Assignment in Cellular Radio," *Proc. of Veh. Tech. Conf.*, pp. 631–637, 1990.

J. Tajima, "A Strategy for Flexible Channel Assignment in Mobile Communication Systems," *IEEE Transactions on Vehicular Technology*, pp. 92–103, vol. 37, No. 2, May 1988.

R.A. Valenzuela, "Dynamic Resource Allocation in Line–of– Sight Microcells," *IEEE Proc. GLOBECOM'92*, pp. 1425–1430, Orlando, 1992.

S. Yasuda & S. Onoe, "Autonomous Channel Assignment Control for Flexible Reuse in Mobile Radio Systems," *Proc. of 42nd Veh. Tech. Conf.*, pp. 798–801, Denver, May 10–13, 1992.

J. Zander & M. Frodigh, "Capacity Allocation and Channel Assignment in Cellular Radio Systems Using Reuse Partitioning," *Electronics Letters*, pp. 438–440, vol. 28, No. 5, Feb. 27, 1992.

J. Zander, "Distributed Cochannel Interference Control in Cellular Radio Systems," *IEEE Transactions on Vehicular Technology*, pp. 305–311, 1992.

PCT International Search Report, Date of Mailing: Jul. 18, 1995.

Conference Proceedings, "Performance of Dynamic Channel Assignment Techniques in a Cellular Environment", Jun. 25, 1992–Jun. 26, 1992, pp. 340–343.

International Search Report re PCT/US96/03863 Date of Mailing of Search Report: Aug. 30, 1996.

Fig. 1 (Prior Art)

| SYSTEM | BANDWIDTH (MHz) | NUMBER OF CHANNELS | BOUNDARY CHANNEL NUMBER | TRANSMITTER CENTER FREQUENCY (MHz) | |
|---|---|---|---|---|---|
| | | | | MOBILE | BASE |
| NOT USED | | 1 | | (824.010) | (869.010) |
| A" | 1 | 33 | 991<br>1023 | 824.040<br>825.000 | 869.040<br>870.000 |
| A | 10 | 333 | 1<br>333 | 825.030<br>834.990 | 870.030<br>879.990 |
| B | 10 | 333 | 334<br>666 | 835.020<br>844.980 | 880.020<br>889.980 |
| A' | 1.5 | 50 | 667<br>716 | 845.010<br>846.480 | 890.010<br>891.480 |
| B' | 1.5 | 83 | 717<br>799 | 846.510<br>848.970 | 891.510<br>893.970 |

| TRANSMITTER | CHANNEL NUMBER | CENTER FREQUENCY (MHz) |
|---|---|---|
| MOBILE | $1 \leq N \leq 799$<br>$990 \leq N \leq 1023$ | $0.030\,N + 825.000$<br>$0.030\,(N-1023) + 825.000$ |
| BASE | $1 \leq N \leq 799$<br>$990 \leq N \leq 1023$ | $0.030\,N + 870.000$<br>$0.030\,(N-1023) + 870.000$ |

F_dtN

BS

STABILIZED CONTROL CHANNEL PLANNING USING LOOSELY COUPLED DEDICATED TRAFFIC CHANNELS

RELATED APPLICATION

This application is related to U.S. patent application Ser. No. 08/418,683, entitled "Automatic Control Channel Planning in Adaptive Channel Allocation Systems" and filed on an even date herewith.

BACKGROUND

The present invention relates generally to adaptive channel allocation in radiocommunication systems and more particularly to automatic control channel planning in systems which utilize adaptive channel allocation.

Various methods have been introduced to efficiently utilize the limited range of frequencies available for radio communications. One well-known example is frequency reuse, a technique whereby groups of frequencies are allocated for use in regions of limited geographic coverage known as cells. Cells containing the same groups of frequencies are geographically separated to allow callers in different cells to simultaneously use the same frequency without interfering with each other. By so doing many thousands of subscribers may be served by a system of only several hundred frequencies.

The design and operation of such a system is described in an article entitled Advanced Mobile Phone Service by Blecher, IEEE Transactions on Vehicular Technology, Vol. VT29, No. 2, May, 1980, pp. 238–244. Commonly known as the AMPS system, this system had allocated to it by the FCC a block of the UHF frequency spectrum further subdivided into pairs of narrow frequency bands called channels. At present there are 832, 30 kHz wide channels allocated to cellular mobile communications in the United States. A table of the frequencies dedicated to mobile communications in the U.S. is shown in FIG. 1. Of the 832 available channels, there are 21 control channels dedicated each to the A-carrier and the B-carrier. These 42 control channels provide system information and cannot be used for voice traffic. The remaining 790 channels, known as voice or traffic channels, carry the burden of voice or data communication.

Frequency planning is a process by which individual channels are assigned to cells within the network. Currently, most frequency planning is done a priori; that is a fixed frequency plan is "hard-wired" in place by each cellular system operator. This is known as fixed channel allocation, or FCA. However, as interference and traffic load are time varying, FCA has disadvantages with regard to system adaptability. For example, in microcells, picocells, and indoor cellular or PCS systems, the base stations are located so densely and the environment is so unpredictable and time-varying (e.g., opening a door changes the interference conditions), that channel planning becomes nearly impossible. Because of the time varying nature of the interference, therefore, an adaptive scheme can offer significant advantages.

Adaptive channel allocation, or ACA, is a method of dynamically allocating frequencies throughout a cellular system to increase system capacity and adaptability. Under an ACA scheme, more frequencies would be allocated to busy cells from more lightly loaded cells. In addition, the channels can be allocated such that all links have satisfactory quality. A common feature of ACA systems is that they allocate a channel out of a set of channels which fulfills some predetermined quality criteria. However, different ACA schemes select channels from the set based upon different criteria.

The concept of ACA is well-known to those skilled in the art, and its potential has been described in various publications. For example, "Capacity Improvement by Adaptive Channel Allocation", by Håkan Eriksson, IEEE Global Telecomm. Conf., Nov. 28–Dec. 1, 1988, pp. 1355–1359, illustrates the capacity gains associated with a cellular radio system where all of the channels are a common resource shared by all base stations. In the above-referenced report, the mobile measures the signal quality of the downlink, and channels are assigned on the basis of selecting the channel with the highest signal to interference ratio (C/I level).

Another approach is described by G. Riva, "Performance Analysis of an Improved Dynamic Channel Allocation Scheme for Cellular Mobile Radio Systems", 42nd IEEE Veh. Tech. Conf., Denver, 1992, pp. 794–797 where the channel is selected based on achieving a quality close to or slightly better than a required C/I threshold. Furuya Y. et a., "Channel Segregation, A Distributed Adaptive Channel Allocation Scheme for Mobile Communications Systems", Second Nordic Seminar on Digital Land Mobile Radio Communication, Stockholm, Oct. 14–16, 1986, pp. 311–315 describe an ACA system wherein the recent history of link quality is considered as a factor in allocation decisions. In addition several hybrid systems have been presented where ACA is applied to a small block of frequencies on top of an FCA scheme. Such an example is presented in Sallberg, K., et al., "Hybrid Channel Assignment and Reuse Partitioning in a Cellular Mobile Telephone System", Proc. IEEE VTC '87, 1987, pp. 405–411.

Apart from increases in system capacity, adaptive channel allocation can obviate the need for system planning. Planning is instead performed by the system itself. This feature of ACA is particularly attractive when system changes are implemented, when new base stations are added, or when the environment changes, for example by the construction or demolition of large buildings.

The above described adaptive channel allocation schemes, however, have generally been utilized only in conjunction with the allocation of traffic channels, and not control channels. Thus, although each base station has access to all the traffic channels, the allocation of control channels has typically remained a fixed allocation in which each base station uses a certain predetermined control channel or channels. Since the control channels are not adaptively allocated, the operator has to plan these channels geographically, i.e., which base gets what control channel so as to minimize the amount of co-channel interference experienced on the control channels. Thus, the advantages of increased capacity and adaptability realized in ACA traffic channel allocation have generally not been achieved with respect to control channel allocation. Because control channels have been fixed to each base station, changes in control channel allocation have required costly system reconfiguration. However, only if both the traffic channels and the control channels are automatically allocated is an operator effectively relieved from planning the system.

A partial solution to the problems of fixed control channel allocation could be provided by a system which directly incorporated the allocation of control channels into a conventional ACA scheme. However, allocation of traffic channels in ACA routines is based on certain criteria such as interference, channel success rate, previous performance of the channel, etc., whereas criteria for measuring quality are quite different for control channels. For example, there is no success rate of previous performance for control channels since (1) a control channel cannot be allowed to be unsuccessful, and (2) the performance of different control channels cannot be compared because this would require alternatively using each of the control channels to get an average performance measure. The latter is not desirable, since control channel allocation should remain reasonably stable.

Another problem with incorporating control channels directly into a conventional ACA routine is that transmission on control channels is bursty and irregular, particularly on the uplink from mobile to base, because the many mobile stations transmit control signals over a range of different distances and power levels. Consequently, measurements of these bursty control signals do not provide a reliable indication on which to base ACA decisions. Thus, the incorporation of control channels directly into a conventional ACA routine is not a desirable solution to the problem presented by the lack of a mechanism for adaptively allocating control channels.

There is a need in the industry, therefore, for a system and method of automatic control channel planning in ACA systems which provide reliability and system adaptability in the allocation of control channels.

SUMMARY

Accordingly, it is an object of the invention to provide a method and apparatus which enable a system using adaptive channel allocation (ACA) for allocating traffic or voice channels, to automatically plan the control channels as well. The method can allocate control channels using any existing ACA scheme, for example in the AMPS or ADC systems, currently used by an operator for traffic channel allocation.

According to exemplary embodiments of the invention, a radiocommunication system utilizes a block of control channels in the frequency spectrum to transmit control information between base stations and mobile stations. The system also utilizes a set of traffic channels to transmit information such as voice information between bases and mobiles. Each base in the cellular system has access to all the traffic channels and all the control channels. Included in the set of traffic channels is a block of dedicated traffic channels, each one of which is associated or coupled with a particular control channel in the block of control channels. The particular frequency pairing of each dedicated traffic channel and its associated control channel is the same wherever these frequencies are reused in the system.

The coupling of the control channels to the dedicated traffic channels provides a method of allocating the control channels. By basing control channel allocation decisions on the base station's selection of dedicated traffic channels, ACA is provided for control channels without directly incorporating them into an ACA routine.

To provide stability in control channel allocation, the control channels are preferably coupled in an average sense to the dedicated traffic channels. Thus, the recent history of a base station's selection of dedicated traffic channels can be monitored and averaged by the base station, the average behavior of the dedicated traffic channels being used to control allocation of a control channel for that base station. This monitoring and averaging can be implemented, for example, with an accumulator for each dedicated channel. From these accumulators an ordered list of the most frequently selected dedicated traffic channels at a particular base station can be produced. When the most frequently selected dedicated traffic channel is changed, a new control channel, coupled to the new most frequently selected dedicated traffic channel, is allocated to the base station. Thus, by allocating the control channels based upon an average past performance of dedicated traffic channels, the invention can provide stability in control channel allocation, ensuring that control channels remain relatively stationary with respect to the base stations, adapting to slow varying changes, but not often being reallocated from frequency to frequency. The control channels are thus loosely coupled to the dedicated traffic channels and do not follow sudden changes in the allocation of dedicated traffic channels.

Because the frequency pairing between the control channels and the dedicated traffic channels is the same wherever the frequencies are reused, there is a high correlation between the quality in the coupled channels throughout the system. This correlation in quality thus allows control channels to be adaptively allocated based on the allocation of the associated dedicated traffic channels without directly incorporating the control channels into an ACA routine.

The invention provides several other advantages over prior radiocommunication systems. For example, the invention allows both the traffic channels and the control channels to be adaptively allocated, which fully relieves an operator from system planning. The benefit of not having to fixedly associate control channels with base stations, and the resultant ability to adapt to slow changes in the environment such as new buildings and large constructions, or changes in the infrastructure such as the addition of more base stations in "hot spots", is of prime importance. The invention thus provides a significant advantage over systems which employ ACA on traffic channels only.

In addition, the invention provides the advantage of operating through the allocation of the traffic channels based on measurements of the traffic channels. These measurements are significantly more reliable and easy to determine than measurements of the control channels.

Finally, the invention provides the ACA benefit that the system can adapt to changing traffic conditions. Peak traffic conditions can be accommodated by temporarily allocating more traffic channels in a restricted area. For control channels, this adaptation to non-uniform traffic is generally less of a concern. However, the present invention allows the usage of more than one control channel in a base when required by traffic conditions.

BRIEF DESCRIPTION OF THE DRAWINGS

The foregoing and other objects, features and advantages of the present invention will be more readily understood upon reading the following detailed description in conjunction with the drawings in which:

FIG. 1 is an illustration of the allocated frequency spectrum as per the U.S. standard IS-54B;

FIG. 5 illustrates accumulators in a base station according to an exemplary embodiment of the present invention.

DETAILED DESCRIPTION

Before describing the details of the present invention, an example of the construction of a cellular mobile radio system in which the present invention can be utilized will be described. While the construction shown depicts a digital system, those skilled in the art will appreciate that it is also possible to implement the present invention on other types of systems such as analog or dual-mode systems.

Figure 2:
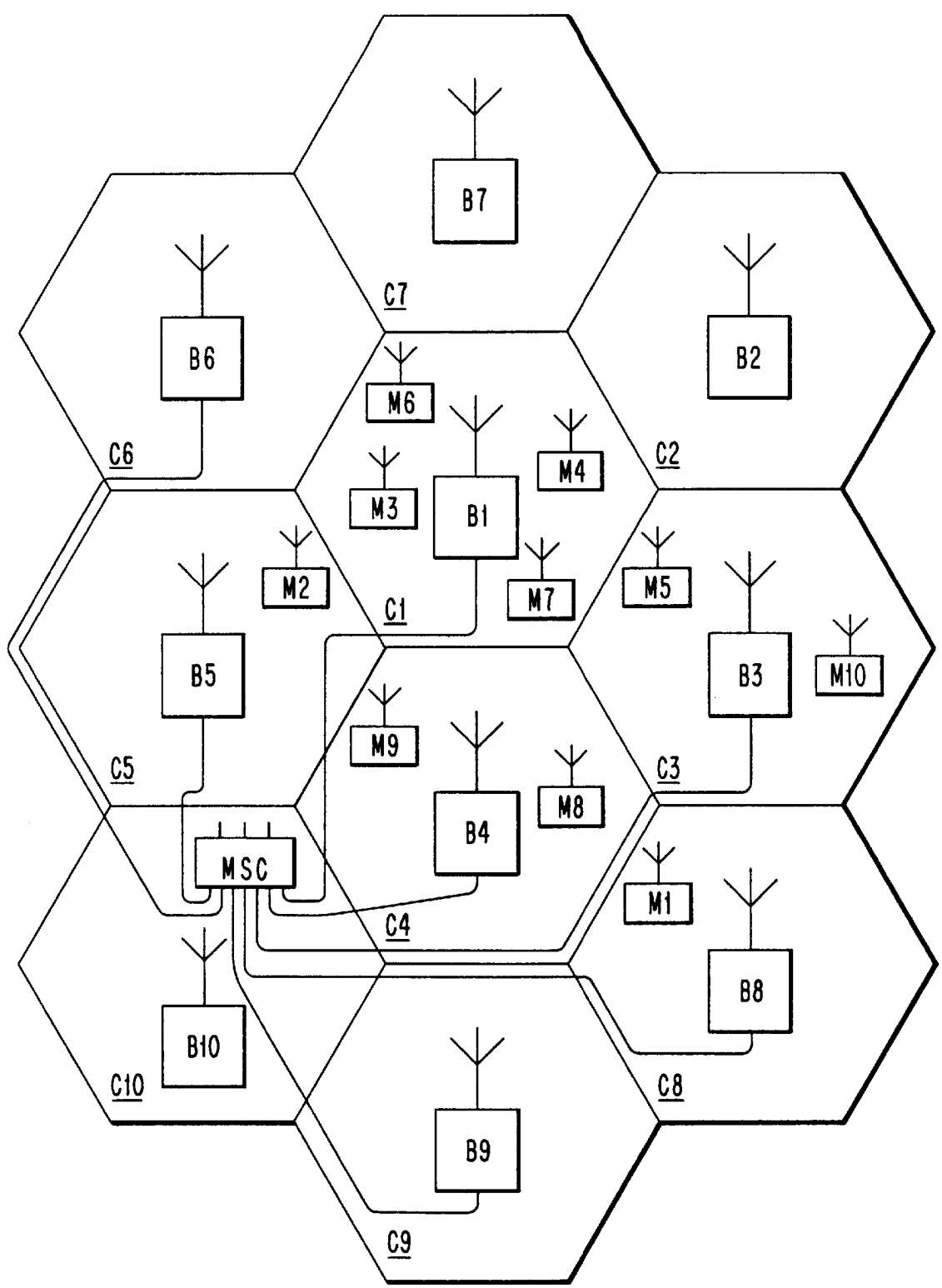
FIG. 2 is a diagram of an exemplary radiocommunication network.

FIG. 2 is a schematic diagram illustrating ten cells, C1 to C10, in a cellular mobile radio telephone system. Normally, methods according to the present invention would be implemented in a cellular mobile radio system comprising many more cells than ten. For purposes of this discussion, the system depicted herein is considered to be an isolated portion of a larger system which has been fragmented.

For each cell C1 to C10, there is a respective base station B1 to B10. FIG. 2 illustrates base stations situated in the vicinity of cell centers and having omni-directional antennas. The base stations of adjacent cells may however be co-located in the vicinity of cell borders and have directional antennas.

Also illustrated in FIG. 2 are ten mobile stations M1 to M10, which are movable within a cell and from one cell to another cell. The method according to the present invention may be implemented in a cellular mobile radio system comprising many more mobile stations than ten. Normally, there are many more mobile stations than there are base stations.

A mobile switching center MSC as illustrated in FIG. 2 is connected to all ten illustrated base stations, for example by cables or other media such as fixed radio links. The mobile switching center is also connected by cables or other media to, for example, a public switching telephone network or similar fixed network with ISDN facilities. To simplify the illustration, not all connections from the mobile switching center to base stations and connections to the fixed network are illustrated in FIG. 2.

Figure 3:
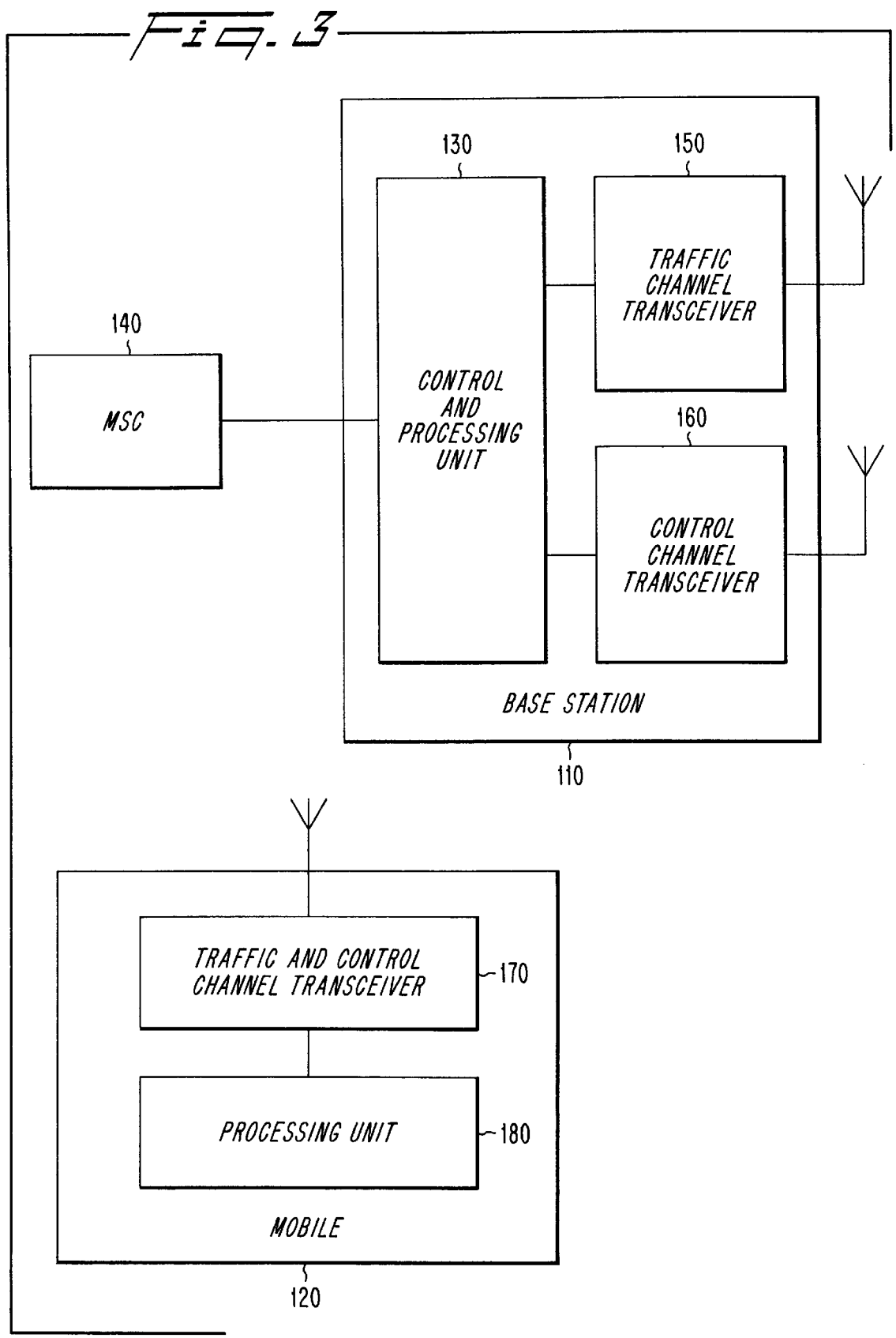
FIG. 3 is a schematic diagram of an exemplary base and mobile station.

An exemplary base station 110 and mobile 120 are illustrated in FIG. 3. The base station includes a control and processing unit 130 which is connected to the MSC 140 which in turn is connected to the public switched telephone network (not shown).

The base station 110 for a cell includes a plurality of traffic or voice channels handled by traffic channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. The traffic channel transceiver broadcasts the traffic or voice channels which can also include digital control channel location information.

When the mobile 120 first enters idle mode, it periodically scans the control channels of base stations such as base station 110 to determine which cell to lock on to. The mobile 120 receives the absolute and relative information broadcast on a control channel at its traffic and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but can also contain relative information concerning other cells proximate to the cell with which the control channel is associated. These adjacent cells are periodically scanned while monitoring the primary control channel to determine if there is a more suitable candidate.

Figure 4:
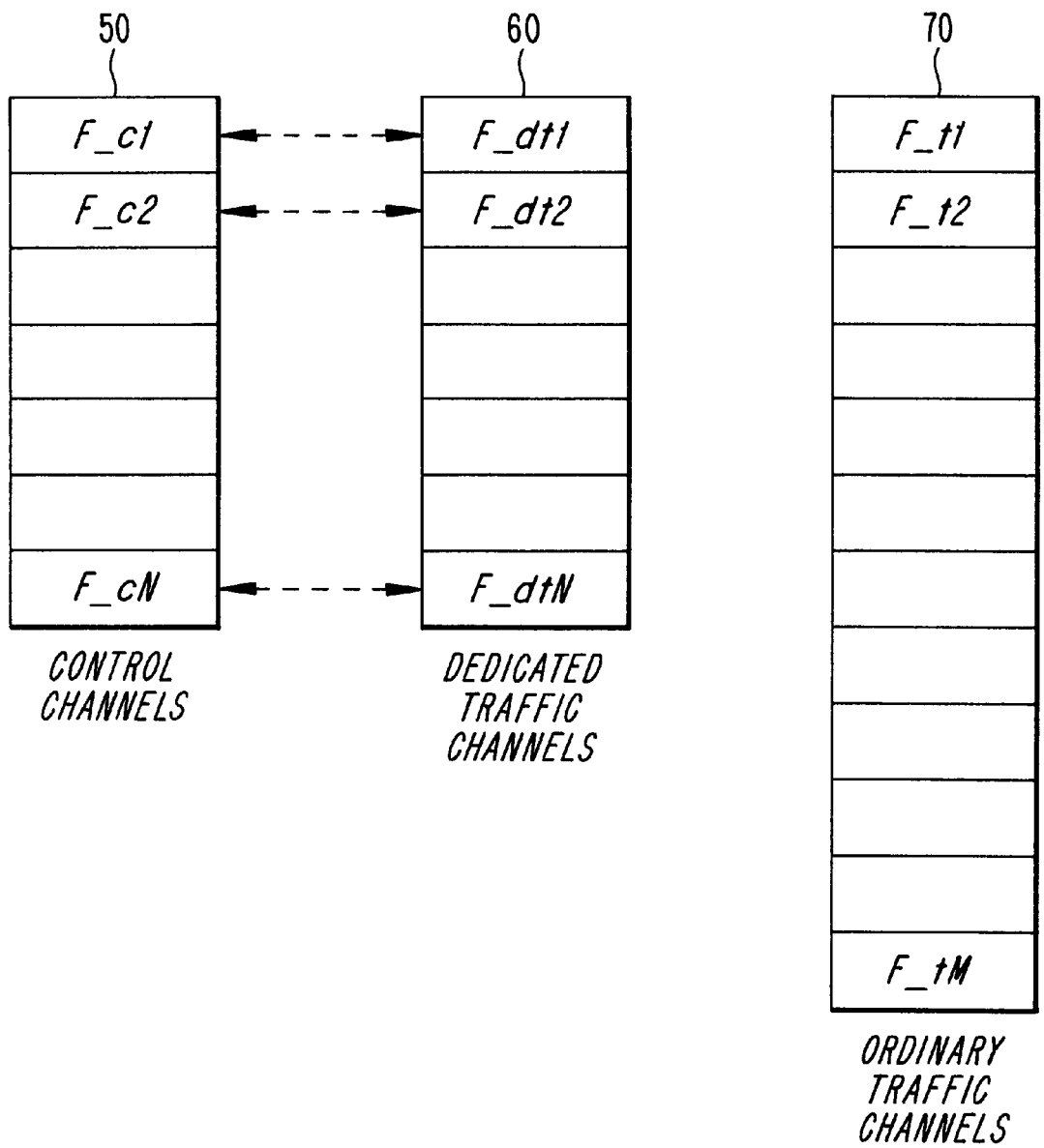
FIG. 4 is a diagram of traffic and control channels in a frequency spectrum according to an exemplary embodiment of the invention.

In the above described radiocommunication system, the frequency spectrum according to an exemplary embodiment of the invention is divided into two parts, one part for the control channels and one part for the traffic channels. FIG. 4 shows a set 50 of N control channels $F\_c1$ to $F\_cN$. Under the AMPS and IS-54 systems, for example, a block of 21 frequencies located in a dedicated part of the frequency spectrum can be set aside for control channels so that the mobiles know where in the frequency spectrum to scan for the control channels. According to other schemes, the control channels may be disposed on channels which are not adjacent to one another and may be located by mobile stations using a variety of mechanisms, e.g., by location information transmitted on traffic channels. Those skilled in the art will appreciate that the present invention is applicable to any system in which control channels are employed.

FIG. 4 also shows sets 60 and 70 of N+M channels used for traffic, including a set 60 of N dedicated traffic channels $F\_dt1$ to $F\_dtN$. For example, a 21-channel, dedicated traffic channel block 60 can be specified somewhere in the channel space, such as adjacent to block 50, although this particular arrangement is not required. Finally, FIG. 4 shows a set 70 of M ordinary traffic channels $F\_t1$ to $F\_tM$.

Unlike conventional systems, the control channels according to exemplary embodiments of the invention can be used by any base station, and no fixed allocation of control channels to base stations is performed a priori. Instead, each control channel is coupled to or associated with one of the dedicated traffic channels, as shown in FIG. 4, resulting in N pairs of control/dedicated traffic channels, $F\_ci/F\_dti$, where i ranges from 1 to N. The method of frequency allocation as well as the division of frequencies used for control channels, dedicated traffic channels, and ordinary traffic channels can be the same in every base station in the cellular system. In addition, the particular frequency pairing of each dedicated traffic channel and its associated control channel can be the same in every base station in the system.

The traffic channels, including the dedicated traffic channels, can be incorporated directly into an ACA scheme, whereby they are allocated to base stations according to changing interference conditions, for example. The ACA scheme used for the traffic channels is preferably a distributed scheme, i.e., the ACA method uses local information and is carried out in the base stations or in the MSC. Under such an ACA scheme, a reallocation of a dedicated traffic channel might occur, for example, because of an unacceptably high co-channel interference level from a nearby base station transmitting on the same dedicated traffic channel frequency. Because the interfering neighboring base station uses the same pairing of dedicated traffic channel and associated control channel, it is also likely that there will be an unacceptably high interference on the control channel frequency. In other words, because all control channels in all bases are coupled in the same way to the dedicated traffic channels in the traffic block 60, there is a strong correlation between the quality and interference level in the coupled channels. Thus, optimizing the dedicated traffic channels in block 60 through the ACA scheme will automatically optimize the control channels in block 50 as well. Since the most successful dedicated traffic channel is the one with the lowest co-channel interference, it is desirable to use its associated control channel as the control channel of the cell. This is because the coupling between the dedicated traffic channels and control channels is the same in all bases throughout the system. Therefore, the co-channel interference conditions in each cell for the dedicated traffic channel and its associated control channel are very similar in quality. Moreover, by basing the channel allocation decisions on measurements of the traffic channels rather than measurements of the control channels, system reliability is enhanced. Because transmission on control channels is bursty and irregular, particularly on the uplink from mobile to base, measurements of the traffic channels provide a more reliable indication on which to base ACA decisions. The way in which the coupling or association between traffic channels and control channels is used to allocate control channels according to the present invention will now be described.

Stability in control channel allocation (i.e., ensuring that control channels remain relatively stationary with respect to the base stations, adapting to slow varying changes, but not frequently hopping from frequency to frequency) is advantageous because mobiles commonly use control channels as references, for example to make decisions about base selection, adaptive power control, and adaptive traffic channel allocation. Mobile-assisted ACA and APC are discussed further in U.S. Pat. Ser. No. 08/207,032 entitled *Method and System for Channel Allocation Using Power Control and Mobile-Assisted Handover Measurements*, filed on Mar. 7, 1994, which is incorporated herein by reference. Thus, control channel allocation according to the present invention is based upon the usage by each cell of the dedicated traffic channels over a period of time. Given the afore-described quality correlation between the dedicated control channels and their respective, coupled control channels, a control channel associated with a most frequently used dedicated control channel will be allocated to a cell or base station.

Figure 5:
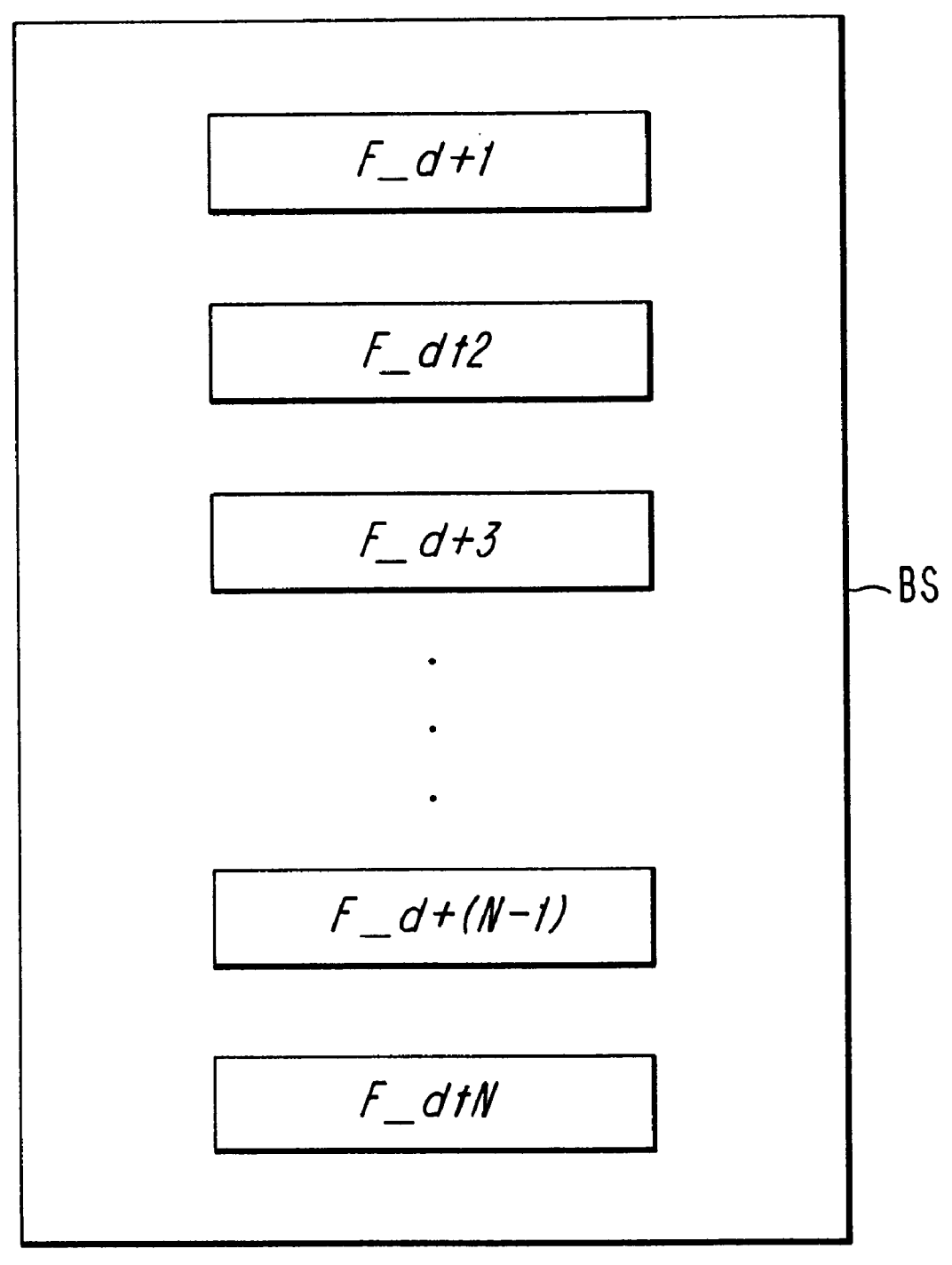

An exemplary embodiment can thus include the step of monitoring the allocation of dedicated traffic channels in each base station. In the controller of the base station, for example, there can be provided N accumulators for the N dedicated traffic channels as shown in FIG. 5. Each time a dedicated traffic channel is allocated for a connection, its corresponding accumulator can be incremented. After a certain period of operation, the accumulators' contents thus indicate which dedicated traffic channels were most successful in the ACA routine, for example by which were allocated most frequently. Therefore, an ordered list with preferred dedicated traffic channels can be provided, starting with the most successful dedicated traffic channel. The accumulators can have a finite memory, for example, accumulating traffic channel information over a period of hours or days. In this way, the system adapts to significant system changes, such as the addition of a new base station nearby, without permitting statistical aberrations to cause changes in control channel assignments. The preferred list can be made using average performance of the dedicated traffic channels, resulting in a form of low pass filtering or integration of channel allocation over time. In this way, when handovers, lost calls, or call terminations occur, such events do not on average influence the preferred list and thus the control channel allocation.

Since the average in the accumulator is taken over a relatively long time interval, for example, hours or days, only slow changes alter the ordering of the dedicated traffic channel list, and therefore the allocation of control channels. The response time to a change in the environment, however, can be reduced by the finite nature of the accumulator. For example, if a dedicated traffic channel has a very good history at a particular base station, its accumulator contents will be very high. If this dedicated traffic channel subsequently becomes unsuccessful and remains unsuccessful, another dedicated traffic channel will take its place. If the accumulators were not finite, this transition might take a very long time. The smaller the accumulators are in size, the faster their response to a "step" input. However, the less integration or low pass filtering that is done, the greater the sensitivity of the accumulator to aberrations. The finite accumulator thus provides a leaky integrator.

Because there is an ordered list of dedicated traffic channels, there is also a corresponding ordered list of control channels which a base station may use to allocate one or more control channels. In the event of a peak traffic load which requires more than one control channel in a cell, more control channels may be allocated, starting with the second control channel from the top of the ordered control channel list and proceeding downwards. This additional allocation of control channels, however, does not necessarily require the allocation of the associated dedicated traffic channels.

To obtain high quality measurements of dedicated traffic channels, long periods of time in which the ACA scheme allocates only ordinary traffic channels should be avoided. This can, for example, be achieved by requiring the ACA scheme to allocate at least one dedicated traffic channel as along as there are users active in the cell. In case the user on the dedicated traffic channel hangs up or is handed over to another base, the next traffic channel allocation (at call set-up or handover) should preferably use a dedicated traffic channel.

The foregoing description focuses on characteristics of the present invention. Those skilled in the art will readily appreciate that the present invention is applicable to any ACA scheme, that is, adaptive channel allocation based upon any quality criteria selection scheme. Moreover, while the illustrative embodiments have been described in terms of mobile stations and cellular systems generally, it will be understood that the present invention is applicable to any type of wireless remote device (e.g., PCS, PDA, modems, data terminals, portable units) and any type of system (e.g., satellite transmission system, hybrid satellite and land-based transmission system, indoor system, etc.).

The foregoing description focuses on characteristics of the present invention. Those skilled in the art will readily appreciate that the present invention is applicable to any ACA scheme, that is adaptive channel allocation based upon any quality criteria selection scheme. Although these exemplary embodiments assume a fixed set of frequencies allocated for control channel usage (e.g., the 21 control channels allocated for AMPS and IS-54), those skilled in the art will recognize that the present invention is also applicable to systems in which the control channel frequencies are not fixed. For example, the digital control channel (DCC) scheme in IS-136 allows a digital control channel to be allocated anywhere in the spectrum. However, since each carrier that supports a DCC also supports two traffic channels in the three slot IS-136 TDMA scheme, one of these traffic channels can be coupled to the DCC on the shared carrier.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for allocating control channels in a radiocommunication system comprising the steps of:

provi ding a plurality of traffic channels in said radiocommunication system;

providing a plurality of control channels in said radiocommunication systems;

associating each of a dedicated subset of said plurality of traffic channels with a respective one of said plurality of control channels;

accumulating a number of times that each of the dedicated traffic channels is allocated to a base station over a period of time; and allocating a control channel to said base station based upon said counted numbers of times.

2. The method of claim 1, further comprising the step of:

allocating another of said plurality of control channels to said base station without allocating associated dedicated traffic channel to said base station.

3. A base station comprising:

a transmitter for transmitting signals on traffic channels and control channels;

means for counting a number of times each of said traffic channels is allocated to said base station; and means for informing a system of said counted number of times.

4. The base station of claim 3 wherein said traffic channels comprise a dedicated subset of a plurality of traffic channels which are coupled to said control channels.

5. In a radiocommunication system having base stations which transmit information on traffic channels and control channels, a method for allocating control channels to the base stations comprising the steps of:

associating at least one of the traffic channels with one of the control channels;

allocating the traffic channels to base stations; and allocating the control channels to the base stations based on the allocation of the associated traffic channels to the base stations.

6. The method of claim 5, wherein the traffic channels are allocated to the base stations using adaptive channel allocation.

7. The method of claim 5, wherein the first step of allocating further comprises the step of:

allocating said traffic channels to said base stations based upon at least one predetermined quality criterion.

8. The method of claim 5, further comprising the steps of:

counting a number of times that each of the associated traffic channels is allocated to one of the base stations; and allocating the control channels based on the counted number of times.

9. The method of claim 5, further comprising the steps of:

determining which of the associated traffic channels has been allocated most frequently in a predetermined time period to one of the base stations; and allocating to said one of the base stations the control channel associated with the determined traffic channel.

10. The method of claim 5, further comprising the step of limiting the number of associated traffic channels that are allocated to one of the base stations.

11. The method of claim 5, further comprising the step of allocating an additional control channel to one of the base stations without allocating to said one of the base stations the traffic channel associated with the additional control channel.

12. A base station in a radiocommunication system comprising:

a transmitter for transmitting signals on traffic channels and control channels;

means for counting a number of times that each of the traffic channels is allocated to the base station; and means for selecting a control channel to be allocated to the base station based on the counted numbers of times.

13. The base station of claim 12, wherein at least one of the traffic channels is associated with one of the control channels.

14. The base station of claim 13, wherein the selecting means selects a control channel associated with a traffic channel having the highest counted number of times in a predetermined time period.

* * * * *